United States Patent [19]
Gittens et al.

[11] Patent Number: 5,484,973
[45] Date of Patent: Jan. 16, 1996

[54] UNDERBEAD WELD SHIELD METHOD AND APPARATUS

[75] Inventors: Timothy E. Gittens, Danbury; Mark S. Nowotarski, Stamford, both of Conn.; Frank A. Digiacamo, Harrison, N.Y.

[73] Assignee: Praxair Technology, Inc., Danbury, Conn.

[21] Appl. No.: 325,760

[22] Filed: Oct. 20, 1994

[51] Int. Cl.⁶ .................................................. B23K 9/16
[52] U.S. Cl. .................. 219/74; 219/61; 228/219
[58] Field of Search .................. 219/72, 74, 61; 228/219

[56] References Cited

U.S. PATENT DOCUMENTS

| | | | |
|---|---|---|---|
| 3,581,041 | 5/1971 | Balfanz, Jr. | 219/60 |
| 3,849,871 | 11/1974 | Kaunitz | 29/483 |
| 3,994,429 | 11/1976 | Hallenbeck et al. | 228/57 |
| 4,096,372 | 6/1978 | Hallenbeck | 219/72 |
| 4,254,321 | 3/1981 | Hellenbeck | 219/72 |
| 4,415,114 | 1/1983 | Hallenbeck | 228/57 |
| 4,454,405 | 6/1984 | Riley | 219/61 |
| 4,476,367 | 10/1984 | Kazlayskas | 219/60.2 |
| 4,528,436 | 7/1985 | Stol | 219/74 |
| 4,723,064 | 2/1988 | Bothe, II | 219/121 FS |
| 4,839,489 | 6/1989 | Dyer | 219/74 |
| 4,866,236 | 9/1989 | DeNale et al. | 219/74 |
| 4,916,281 | 4/1990 | Flasche et al. | 219/61 |
| 4,956,537 | 9/1990 | Schnorrer | 219/74 |
| 5,100,043 | 3/1992 | Hallenbeck | 228/42 |
| 5,126,526 | 6/1992 | Schnorrer | 219/74 |
| 5,152,453 | 10/1992 | Leturno | 228/219 |
| 5,187,343 | 2/1993 | Edwards | 219/74 |
| 5,231,258 | 7/1993 | Hunt | 219/74 |
| 5,234,148 | 8/1993 | Stone et al. | 228/8 |
| 5,235,152 | 8/1993 | Jankus | 219/74 |

FOREIGN PATENT DOCUMENTS

| | | | |
|---|---|---|---|
| 2205963 | 7/1973 | Germany | 219/72 |
| 3728184 | 4/1988 | Germany | 228/219 |

OTHER PUBLICATIONS

"Universal Traveling Purge Tool System" a brochure by American Engineering and Welding, 8030 E. 47th Street, Indianapolis, Ind. 46226.

"Hallenbeck Cone Purge Units" a brochure by Emerson Hallenbeck Cone Purge Unit Company, 2934 Shoreland Avenue, Toledo, Ohio 43611.

*Primary Examiner*—Clifford C. Shaw
*Attorney, Agent, or Firm*—Stanley Ktorides

[57] ABSTRACT

A weld shield apparatus provides an atmosphere of inert gas within a conduit in an underbead region where an external weld joint is to be produced. The weld shield apparatus includes a diffuser structure having a convex exterior surface that is defined by a wall structure, the convex exterior surface is shaped to fit within the conduit and to be separated from an inner wall of the conduit by a clearance space. The diffuser wall structure is comprised of a porous material which enables gas communication between an inlet to the diffuser and the convex exterior surface. A seal is positioned immediately upstream from the diffuser structure and is positioned to engage the inner walls of the conduit so as to prevent the passage of gas in an upstream direction. A source of gas is coupled to the inlet to the diffuser structure and enables inert gas to pass through the porous material and to flow in a laminar manner, via the clearance space, past the underbead region and into the downstream region of the conduit. The resulting laminar flow and use of a neutral density gas enable small amounts of gas to be employed as a weld shield.

12 Claims, 2 Drawing Sheets

UNDERBEAD WELD SHIELD METHOD AND APPARATUS

FIELD OF THE INVENTION

This invention relates to a method and apparatus for providing an inert gas atmosphere in an underbead weld region and, more particularly, to a method and apparatus for providing an inert gas shield within an interior of a conduit that is being welded.

BACKGROUND OF THE INVENTION

During welding of alloy metals, the weld area should be out of contact with air or any other oxygen-bearing gas. By providing an inert gas in the weld region, contamination of a molten weld puddle from surrounding oxygen is prevented. Commonly, inert shielding gases are provided to a molten weld puddle via an annular passage-way surrounding the welding torch. Such an inert gas supply provides a limited region of inert gas beneath the torch. The prior art includes many teachings of weld shielding structures. In tube welding, an inert purging gas has been introduced into the tube. For stationary weld joints, particularly circumferential seams, the earliest method, which is still used today, involves sealing the ends of the tube and filling the tube with the inert gas. Such procedures are shown in U.S. Pat. Nos. 4,723,064 and 5,187,343. The tube-fill procedure is time consuming, uses excessively high amounts of the inert gas and does not always produce consistently good quality welds. U.S. Pat. No. 5,126,526 discloses a pair of sealing devices connected by a rod which enable an enclosure of a tube to be welded.

A more recent development employs inflatable bladders which are deployed on either side of a tube joint to be welded (i.e., see U.S. Pat. No. 5,100,043). Some of the inert gas used for shielding is also used to inflate the bladders and further inert gas is injected into the chamber created by the inflated bladders. Over time, the inert gas dilutes and later displaces the air in the weld area, thus creating an inert atmosphere for a subsequent weld operation. A serious drawback in this technique is that at least one bladder must be moved over hot metal during removal of the sealing structure, hence, damage results. A variation of the localized seal structure employs a collapsible cone (see U.S. Pat. No. 4,415,114) which is inserted into the tube and is opened (like an umbrella) to seal the area adjacent to the weld zone.

Double chamber arrangements have also been suggested to minimize the effect of leaks that may develop in the chamber immediately surrounding the weld region. See, for example, U.S. Pat. No. 5,231,258. In such a double chamber arrangement, inert shielding gas is present in both chambers so that leaks in the central weld chamber do not give rise to atmospheric contamination.

Diffusers have been suggested in the prior art for the purpose of reducing turbulence in flow of a shielding/purging gas. U.S. Pat. No. 4,916,281 describes the use of a diffuser for back purging and torch shielding in butt welding of a pipe. The '281 patent describes a pair of dams, with a diffuser attached to a bottom dam (for vertical welding). The upper dam is provided with a small hole to allow the gas to escape. In U.S. Pat. No. 5,235,152 a pair of ring seals within a pipe straddle a junction to be welded. A porous material is placed between the seals, and gas is supplied from inside the pipe and floods the seam to be welded (through the porous material). Because the ring seals of the '152 patent are positioned on either side of the weld region, removal of the structure causes at least one of the seals to ride over the weld area and to be possibly damaged as a result of the hot metal surface. U.S. Pat. Nos. 4,528,436 and 5,152,453 describe the use of diffusers to enable an even flow of an inert shielding gas during welding of tubes, pipes, rods etc. In both patents, the diffusers are positioned outside of the pipe, with the '453 patent indicating that the diffusers enable a laminar flow of inert gas along the pipe's external surface.

Weld shielding gases that are much denser and heavier than atmospheric gases are also known in the prior art and their advantages are discussed, for example, in U.S. Pat. No. 4,839,489. Use in welding applications of "neutral density" gases is also known (i.e. gas mixtures that have the same density as the surrounding atmosphere). U.S. Pat. No. 5,234,148 describes the use of such gas mixtures in shielding or purging applications, the proportion of the gas being controlled such that the gas mixture has a density approximately equal to that of the surrounding air. U.S. Pat. No. 5,234,148 also mentions the advantages of use of mixtures of gases having a density about the same as the density of atmospheric air. The '148 patent indicates that such gases may be used for open-butt welding where conventional vacuum or flow purging is not feasible. It notes that the sealing of a pipe is not necessary and that such mixtures enable welding in open-ended tubes. The '148 patent makes the point that since the density of the gas mixture is substantially the same as that of the ambient atmospheric air, the gas mixture remains at the welding zone so as to prevent air from affecting the weld quality.

The above noted prior art has a number of drawbacks. Some employ inflatable or fixed seals on either side of the weld joint which require, when the seals are withdrawn, that at least one of the seals is brought into contact with the welded region and any residual heat still present. Other systems require the use of slidable seals which are difficult to align and provide inconsistent results. Still others require that the entire tube be filled with an inert gas which is a wasteful process.

Accordingly, it is an object of this invention to provide an improved weld shielding apparatus and system particularly adapted to use in conduits.

It is a further object of this invention to provide an improved weld shielding method and apparatus wherein only a limited amount of inert shield gas is required.

It is still another object of this invention to provide an improved weld shield method wherein a significant reduction in purge time is achieved.

SUMMARY OF THE INVENTION

A weld shield apparatus provides an atmosphere of inert gas within a conduit in an underbead region where an external weld joint is to be produced. The weld shield apparatus includes a diffuser structure having a convex exterior surface that is defined by a wall structure, the convex exterior surface is shaped to fit within the conduit and to be separated from an inner wall of the conduit by a clearance space. The diffuser wall structure is comprised of a porous material which enables gas communication between an inlet to the diffuser and the convex exterior surface. A seal is positioned immediately upstream from the diffuser structure and is positioned to engage the inner walls of the conduit so as to prevent passage of gas in an upstream direction. A source of inert gas is coupled to the inlet to the diffuser structure and enables inert gas to pass through the porous material and to flow in a laminar manner, via the clearance space, past the underbead region and into the downstream region of the conduit. The laminar flow and use of a neutral density gas enable small amounts of inert gas to be employed as a weld shield.

DETAILED DESCRIPTION OF THE INVENTION

As used herein, the term "underbead" refers to an area immediately juxtaposed to a weld joint that is disposed on an opposite side of the weld joint from which a welding torch is being applied. The term "laminar" flow means that the root mean square of the random fluctuations in the fluid layer velocity at the source or origin of the fluid layer are less than about 0.1 times the average velocity of the fluid in its direction of flow at its source of origin and that the root means square of the sizes of turbulent eddies in the fluid layer at its source of origin are less than 0.1 times the thickness of the layer at the source of origin of the fluid layer. The term "inert" gas means any substance which can prevent metals from oxidizing during a welding operation.

Figure 1:
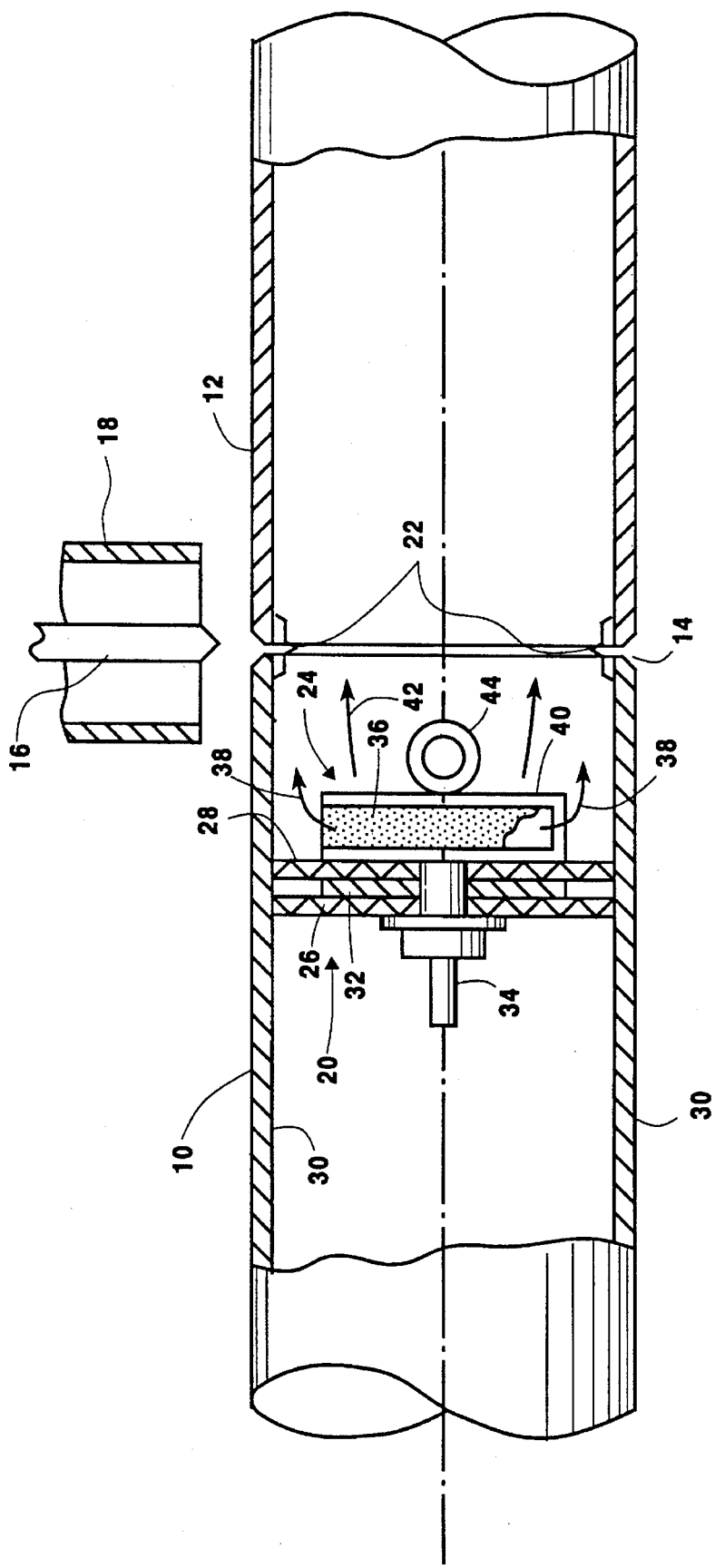
FIG. 1 is a cross section of a conduit wherein a weld shield apparatus is shown that incorporates the invention hereof.

Referring now to FIG. 1, a pair of conduit sections 10 and 12 are to be welded together at butt joint 14. A weld electrode 16 is positioned within a housing 18 and provides the necessary arc to enable the welding action. An underbead shield apparatus 20 is positioned within conduit 10 and provides a flow of neutral density, inert gas into underbead region 22 to prevent atmospheric contamination of weld joint 14. Weld shield apparatus 20 comprises a porous diffuser head 24 which is attached to a pair of seal disks 26 and 28 which abut inner wall surfaces 30 of conduit 10. Flexible seal disks 26 and 28 are preferably made from silicone rubber. A metal spacer plate 32, which has a diameter slightly smaller than that of seal disks 26 and 28, is positioned therebetween and provides structural rigidity therefor. An inert gas supply tube 34 passes through an aperture in sealing disks 26, 28 and spacer plate 32 and enables gas communication with the interior of diffuser 24. It is to be noted that only a single "upstream" seal structure is required to enable operation of weld shield apparatus 20. In other words, no seal is required "downstream" from weld joint 14.

Diffuser 24 is preferably constructed from a porous metal and the sizes of its pores may vary between 2 and 100 microns. Diffuser 24, while preferably exhibiting a porous metal wall, may also be constructed of other materials, e.g., plastic, cardboard, so long as the material can withstand the weld environment and further exhibits the structure and porosity to enable a required laminar gas flow.

The outer diameter of diffuser 24 should enable adequate clearance for insertion and removal thereof from conduits 10 and 12. Flexible seal disks 26 and 28 and supporting spacer plate 32 should allow flexibility for positioning of diffuser 24 and enough rigidity for alignment thereof. It is not necessary to assure concentricity within the internal diameter of conduits 10 and 12. It is to be understood that the term "conduit" is meant to include pipes, tubes, and any other fully enclosed conduit-like structure, whether of circular or other cross section.

Diffuser 24, as above stated, comprises a porous metal structure 36 which enables an inert gas entering from tube 34 to exit about the periphery (in the manner shown by arrows 38) and to pass along the inner surface of conduit 10 and weld underbead region 22. Front face 40 of diffuser 24 may also be porous to enable inert gas to pass directly therefrom in the direction shown by arrow 42. An eyelet 44 enables a stabilizing line to be attached to weld shield 20 so that it may be repositioned by either pulling on eyelet 44 or on tube 34, to properly position diffuser 24 in the weld underbead region.

The specific location of diffuser 24 relative to a weld joint depends upon several factors. If a welding arc penetrates the joint and protrudes into the interior of conduits 10 and 12, front face 40 of diffuser 24 should be positioned approximately ½ inch from the center line of the weld joint. If weld arc does not penetrate the joint, diffuser 24 may be placed immediately under the joint.

Weld shield apparatus 20 may also be used for (i) continuous joints where a welding head is fixed and the conduit moves under the welding arc to provide a linear weld along its length, and (ii) for fixed joints where the conduit does not move relative to the welding arc. A uniform displacement of air within the conduit pushes the air downstream and out, thereby replacing the air with the purging gas. Such operation insures better protection (inerting) of the finished weld, since the area beneath the welding arc is filled with inert gas.

Neutral density gas blends are preferred for use with this invention. A neutral density gas blend has a density that is equivalent to that of air. The neutral density gas, as aforestated, is introduced via tube 34, passes through seal disks 26, 28 and spacer 32 into diffuser 24. From diffuser 24, the gas emerges in a laminar flow (arrows 38) and displaces the air in conduits 10 and 12, uniformly and rapidly, making a second downstream seal unnecessary. Tube 34 may be used to move weld shield 20 in a leftward direction (as shown in FIG. 1) after the weld has been produced, so as to prevent seal disks 26 and 28 from being pulled over a just welded area. A belaying line or rod may be attached to eyelet 44 to enable more accurate positioning of weld shield 20.

Preferred purge gases for use with this invention are neutral density gas blends usually containing helium. The blends may be a combination of the following gases, in which the density of the mixture is equal to that of air: argon and nitrogen; argon and helium; argon and hydrogen; argon, helium and hydrogen; argon, helium and carbon dioxide; argon, helium, hydrogen and carbon dioxide; argon, helium and oxygen; argon, helium, oxygen and carbon dioxide; argon, helium, hydrogen, oxygen and carbon dioxide; argon, helium and nitrogen; and helium and carbon dioxide. The use of any of the aforestated neutral density gas blends enables air displacement within conduits 10 and 12 and reduces oxygen concentration in the weld underbead regions in less time than gas blends that are heavier than air.

Figure 2:
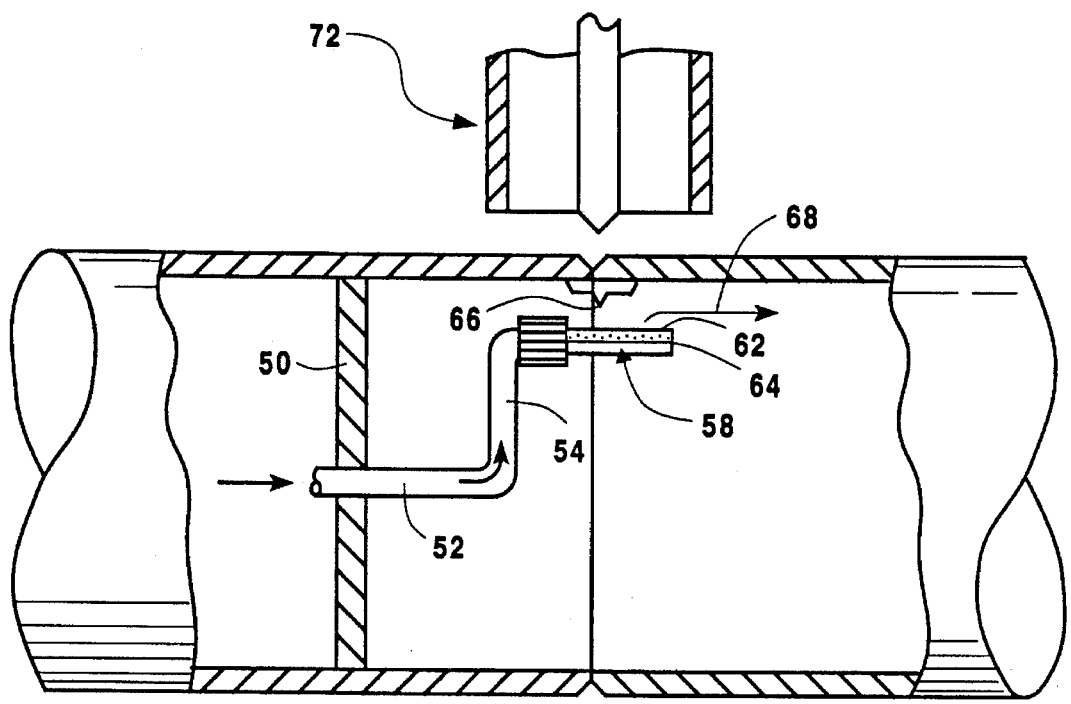
FIG. 2 is a schematic of a conduit showing a second embodiment of a weld shield apparatus that incorporates the invention hereof.
Figure 3:
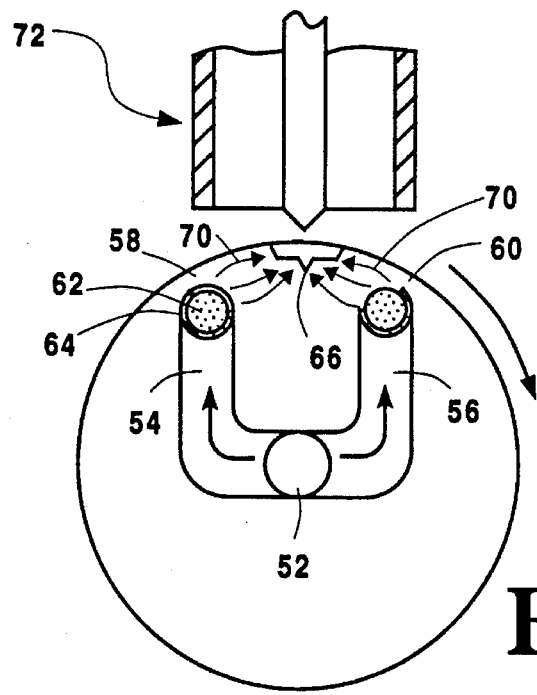
FIG. 3 is an end view of the weld shield apparatus shown in FIG. 2.

Turning to FIGS. 2 and 3, a second embodiment of the invention is shown (schematically) that is particularly useful for large diameter conduit or for conduits wherein an extended linear weld along the length of the conduit is to be produced. Seal 50 is shown schematically and is of the same structure as seal disks 26, 28 and spacer 32 shown in FIG. 1. A tube 52 carries a neutral density, inert gas to a pair of support arms 54 and 56 (see FIG. 3) which, in turn, have diffusers 58 and 60 mounted at their ends. Each diffuser includes a porous metal portion 62 that is supported by a half cylinder 64. Half cylinder 64 enables gas to escape from porous metal portions 62 only in the direction of a weld underbead region 66. Full cylinder diffusers may also be employed which allow gas to escape in all directions.

Inert gas flow from porous metal portions 62 enables underbead region 66 to be bathed in a laminar flow of inert gas in the direction indicated by arrow 68 (FIG. 2) and arrows 70 in FIG. 3. If weld head 72 is being used to weld a circumferential joint, then either the conduit structure is rotated while weld head 72 and support arms 54 and 56 are maintained stationary or, in the alternative, the conduit is held stationary and weld head 72 and support arm 54 and 56 are concurrently rotated. In a similar fashion, if a linear weld joint along the conduit is being produced, then either the conduit or the combination of weld head 72 and support arms 54 and 56 are moved so as to enable the laminar flow of inert gas to be continually positioned in the underbead region where the weld joint is being produced.

The structure shown in FIGS. 2 and 3 enables a keyhole plasma arc welding operation to occur between diffusers 58 and 60, while still enabling laminar flow of the inert gas past underbead region 66. The porous metal diffusers may be constructed of sheet, tube or may be porous filters that are preformed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A weld shield apparatus for providing an atmosphere of inert gas within a conduit in an underbead region of a weld joint, said conduit having upstream and downstream regions, said weld shield comprising:
   (a) a diffuser means having an exterior surface shaped to fit within said conduit and be separated from an inner wall of said conduit by a clearance space, at least a portion of said exterior surface comprised of a porous material which enables gas communication between an inlet to said diffuser means and said exterior surface;
   (b) a single seal, said single seal positioned immediately upstream from said diffuser means and positioned to engage said inner wall of said conduit so as to prevent a passage of gas further upstream; and
   (c) a source of inert gas coupled to said inlet of said diffuser means for causing a flow of said inert gas through said porous material and, via said clearance space and in laminar manner, past said underbead region and into said downstream region of said conduit.

2. The weld shield apparatus as recited in claim 1, wherein said diffuser means comprises a porous wall having a cylindrical shape whose diameter is less than a diameter of said conduit.

3. The weld shield as recited in claim 2, wherein said porous wall has pore sizes within a range of 2–100 microns diameter.

4. The weld shield apparatus as recited in claim 1, wherein said porous material comprises a sheet of porous metal that is formed into a cylindrical shape, with an open interior into which said inert gas is introduced.

5. The weld shield apparatus as recited in claim 1, wherein said source of inert gas provides a gas whose density is substantially equal to that of air.

6. The weld shield apparatus as recited in claim 5, wherein said inert gas is a mixture of gases selected from the group consisting of: argon and nitrogen; argon and helium; argon and hydrogen; argon, helium and hydrogen; argon, helium and carbon dioxide; argon, helium, hydrogen and carbon dioxide; argon, helium and oxygen; argon, helium, oxygen and carbon dioxide; argon, helium, hydrogen, oxygen and carbon dioxide; argon, helium and nitrogen; and helium and carbon dioxide.

7. The weld shield apparatus as recited in claim 1, wherein said diffuser means comprises at least a pair of diffuser structures that are mounted so as to be positioned to either side of said underbead region, each diffuser structure directing a laminar flow of said inert gas toward said underbead region.

8. The weld shield as recited in claim 7, wherein each said diffuser means comprises a porous wall.

9. The weld shield as recited in claim 8, wherein said porous wall has pore sizes within a range of 2–100 microns diameter.

10. A process for welding a pair of conduit sections at a butt joint, said process comprising the steps of:
    (a) providing a first inert gas around the butt joint to be welded;
    (b) providing, through a single sealing means, said single sealing means placed on one side of said butt joint, a laminar flow of a second inert gas having a density substantially equal to air into an underbead region of said butt joint, transversely or perpendicularly through a porous diffusing wall comprising pores having a diameter in the range of about 2 to about 100 microns; and
    (c) directing a weld electrode along said butt joint to weld said conduit sections.

11. The process as recited in claim 10, wherein said first inert gas and second inert gas are mixtures of gases selected from the group consisting of: argon and nitrogen; argon and helium; argon and hydrogen; argon, helium and hydrogen; argon, helium and carbon dioxide; argon, helium, hydrogen and carbon dioxide; argon, helium and oxygen; argon, helium, oxygen and carbon dioxide; argon, helium, hydrogen, oxygen and carbon dioxide; argon, helium and nitrogen; and helium and carbon dioxide.

12. A weld shield apparatus for providing an atmosphere of inert gas within a conduit in an underbead region of a weld joint, said conduit having upstream and downstream regions, said weld shield comprising:
    (a) a diffuser means having an exterior surface shaped to fit within said conduit and to be separated from the inner wall of said conduit by a clearance space and a front surface facing said downstream region of said conduit, at least a portion of said front surface comprised of a porous material which enables gas communication between an inlet to said diffuser means and said front surface;
    (b) a single seal, said single seal positioned immediately upstream from said diffuser means and positioned to engage said inner wall of said conduit so as to prevent a passage of gas further upstream; and
    (c) a source of inert gas coupled to said inlet of said diffuser means for causing a flow of said inert gas through said porous material and said front surface, and in a laminar manner, past said underbead region and into said downstream region of said conduit.

* * * * *